Sept. 6, 1966  V. A. KOLESH ET AL  3,270,786
SHANKS FOR INSERTED TOOTH SAWS AND ASSEMBLIES OF SAME
Filed Aug. 18, 1965

INVENTORS
Victor A. Kolesh
Walter E. Lamlein
by Roberts, Cushman & Grover
Att'ys

United States Patent Office 3,270,786
Patented Sept. 6, 1966

3,270,786
SHANKS FOR INSERTED TOOTH SAWS AND
ASSEMBLIES OF SAME
Victor A. Kolesh, Holden, and Walter E. Lamlein, Leominster, Mass., assignors to Simonds Saw and Steel Company, Fitchburg, Mass., a corporation of Massachusetts
Filed Aug. 18, 1965, Ser. No. 480,742
1 Claim. (Cl. 143—151)

This application is a continuation-in-part of our copending application S.N. 236,527, filed November 9, 1962, and now abandoned, as a continuation of our also copendent application S.N. 124,223, filed July 14, 1961, now Patent 3,088,502 patented May 7, 1963.

The invention hereof relates to an improved bit-holding shank for use in saws of the inserted tooth type wherein tooth cutter elements, known as bits, are replaceably held in operative position in sockets at the edge of the saw plate or body by holder means, known as shanks, which cooperatively engage the bits and the sockets in a strut-like fashion.

While not limited thereto, replaceable tooth saws have been widely used for circular saws used as head, edger and rift saws employed in timber sawing operations. The peripheral speed of these saws, depending on various factors, may range between about 4,400 and about 12,000 feet per minute or between about 50 and upwards of 140 miles per hour.

In such inserted tooth circular saws the replaceable bits are retained by the shanks in sockets arranged about the periphery of the saw body. The bit and shank are inserted and removed from the saw body by being rotated (either separately or jointly depending on the design) in the socket by means of an appropriate tool.

The inner or central concave edge of the shank and the forward edge of the bit are inset to form a chip and dust-receiving gullet of substantial capacity lying beneath or inward and forward of the cutting edge. Generally the trailing portion of the shank at the area thereof adjacent the gullet is provided with a widened portion referred to as a swage.

Such swage portion of the shank is thicker than the saw plate and is designed (1) to match the thickness of the gullet-forming portion of the bit where it joins the gullet-forming portion of the shank and (2) to provide a back portion for the gullet into the space between the saw body and the walls of the kerf. Such swage portion is normally of uniform thickness and generally terminates forwardly at a point, the swage point, on the gullet-forming edge of the shank near the bottom of the gullet. Since the swage portion of the shank must move along the side walls of the kerf, some dust may slip past the swage and into the kerf. As long as the wood is reasonably dry this causes no difficulties since the loose dust also flies off of the saw body when it is out of contact with the log.

When sawing very wet timber and especially when sawing frozen timber, difficulties frequently arise. These include the fact that the bits have a tendency to creep, and the saw the tendency to overheat, to vibrate and to run in and out. It is believed that while the chips from normally dry timber tend to swirl around in the gullet rather freely, the chips from wet and especially frozen timber tend to jam together and compact into a relatively solid mass. If this occurs, the gullet may not completely free itself of chips as it leaves the cut, especially in an area in which a body of chips have become compacted.

Chips will tend to collect either if there is a projection in the gullet against which the chips tend to rest or if the gullet is so shaped that as the chips are deflected and propelled by the gullet-forming portions of the bit and shank including the swage portion thereof they tend to follow a single path. In the event of a buildup of compacted chips in the gullet, various mentioned difficulties tend to arise. As more chips are jammed into the pre-existing build-up of chips at the high velocities employed in sawing, the compacted mass tends to increase and to expand laterally, with rubbing contact against the walls of the cut. This rubbing contact would tend to break up the chips to form dust and to force chips and dust still in a compacting and compacted condition out of the gullet into the space between the walls of the saw body and the sides of the kerf, with resulting friction capable of causing the saw to heat rapidly. This heretofore generally uncontrolled action is known to sawyers as "spilling the dust." Should more chips slip to one side of the kerf than the other, the uneven force acts to distort the saw and cause it to lead or run out as well as to overheat.

A continued buildup of compacted chips in the gullet can apply a reverse or rearward force to the shank at the swage point. This can occur either if the body is distorted sufficiently to force the swage point to bind against a side of the kerf or if chips build up ahead of the swage point. Such rearward directed pressure on the swage point is disposed to rotate the shank in its socket toward the bit, with the effect either of loosening the bit and causing it to creep or of applying excessive pressure to the wall of the socket and causing the saw body to distort and wobble or both.

The key to the successful operation of an inserted tooth saw in excessively wet or in frozen timber would appear from these observations to be: (1) the elimination of areas within the gullet in which the chips would tend to collect and particularly including any aperturing or interruption of the continuous solid metal walls at the end of the shanks, and (2) the prevention of the collection of more than a minimal amount of dust. Compaction can occur only when successive chips are forced into contact with each other in dust under such conditions tending to act as a cement to bind together the chip and dust accumulation.

It is the object of this invention therefore to provide a bit-holding shank for inserted tooth saws wherein the chips are dispersed within the gullet, the breaking of chips in the formation of dust is minimized, and projections against which chips might become lodged are eliminated, while at the same time to provide for regulation of such dispersing action for most efficient operation under different working conditions such as those of winter and summer and of wet or frozen timber as above mentioned.

The invention may be more easily understood by reference to the accompanying drawings, in which.

Figure 1:
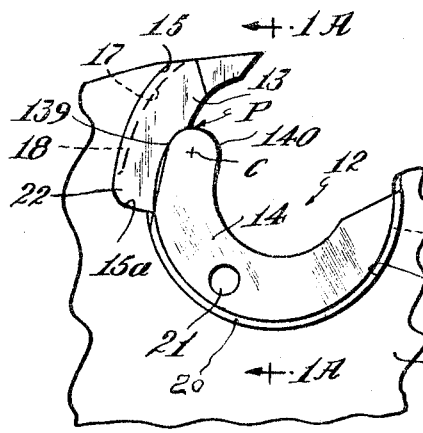
FIG. 1 is a side elevation of a portion of a saw plate showing a bit and a shank installed.
Figure 2A:
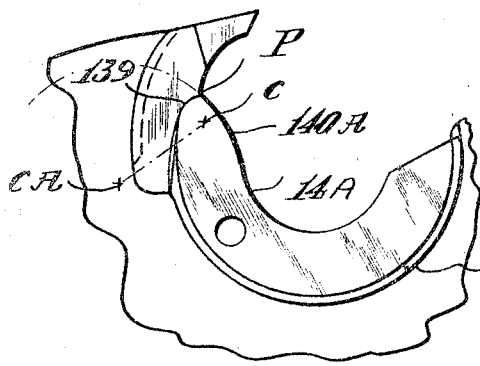
Figure 3:
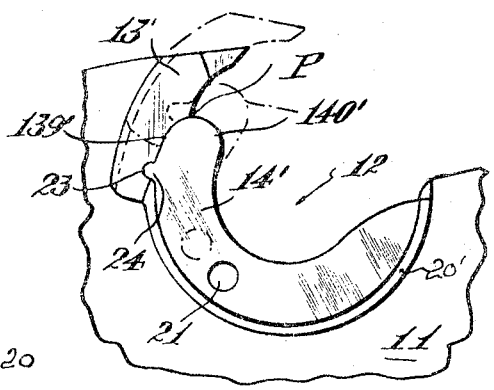
Figure 4:
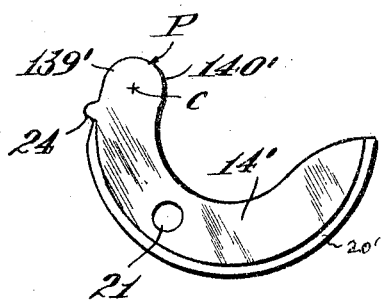

FIG. 2A corresponding to FIG. 1 shows the same style of shank adjusted to normal summer operations, in the absence of frozen or excessively wet timber;

FIG. 3 is a side elevation corresponding to that of FIG. 1 showing another shank embodiment as appropriate for a different style bit, with the fully installed position in full line and an intermediate condition in broken line;

FIG. 4 is a side elevation of the shank of FIG. 3, and

Figure 4A:
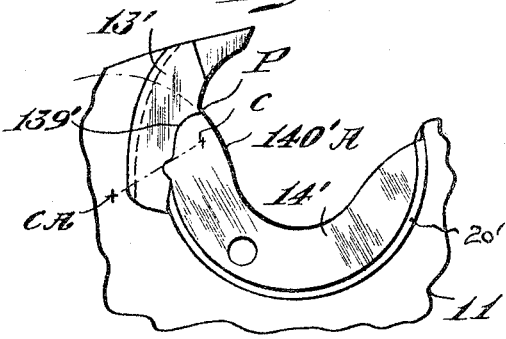

FIG. 4A illustrates the similar regulation of the dispersing capacity of the FIG. 4 style of shank to the different operating conditions as mentioned in connection with the shank of FIGS. 1 and 2A.

As shown in the drawings, a marginal portion of a typical saw plate 11 is provided with a series of sockets 12 (only one of which is shown) adapted to receive a pair of insert elements comprising a bit 13 and a shank 14. In the drawing (in which the parts are shown in substantially full scale for a typical saw assembly) the elements are oriented so that the center of revolution of the saw body is vertically below (and outside the margin of the sheet) for each figure.

Socket 12 is shown as formed in two portions, a bit-receiving portion 15 and a shank-receiving portion 16. Both portions are circular in shape with a common or nearly coincident center, the radius of the bit-receiving portion 15 being greater than the radius of the shank-receiving portion 16. The shoulder 15a between the bit-receiving portion 15 and the shank-receiving portion 16 provides an abutment preventing bit 13 from being dislodged when it comes into contact with the timber. The socket as a whole is located within the outer periphery of the saw body 11 so that the widest portion of the socket is within the saw body and the walls of the socket approach each other at their junction with the outer edge of the saw body. In the two-circle styles of socket shown these are so located that the shank portion of the socket if projected throughout a complete circle is within or nearly within the outer periphery of the saw.

The wall of both portions of socket 12 is provided with an upstanding peripheral V-shaped edge 17 and the cooperating portion of the bit and the shank are provided with a mating V-shaped groove indicated at 18 and 19 respectively in order to provide lateral stability for the assembly. Shank 14 of FIGS. 1-2A and also shank 14' of the subsequent views is shown as having a single tool-receiving aperture at a generally central intermediate portion as indicated at 21 to permit the engagement of a suitable tool for inserting or removing the bit and shank assembly.

As earlier noted, best results as to dispersing chips and dust and reducing tendency thereof to collect on the shanks are experienced when the ends of the shanks such as 14 and 14' illustrated herein, and especially the ends adjacent the bit 13 or 13' are integrally formed of solid continuous metal free of recesses or apertures extending transversely partly or wholly through them, whereby any opportunity for entraining of sawdust by the shanks is reduced to a minimum.

Bit 13 (FIG. 1) and bit 13' (FIG. 3) as shown are typical of replaceable bits in widespread use today. When in place the upper outer edge serves as a continuation of the outer edge of the saw body and terminates at its forward tip (in the direction of the saw rotation) in a cutting edge. The rearward edge cooperates with the bit-receiving portion of the socket 12 and the forward part immediately back of the cutting edge is reduced in thickness behind and below the cutting edge to provide clearance for the chips.

Bits are retained in place in a variety of ways. In the case of the style shown in FIG. 1 the V-shaped edge of bit-receiving portion 15 of socket 12 is cut away near the base of said portion and bit 13 is provided with a cooperating protrusion 22 at the base of the rearward margin. With this style of mounting, the bit 13 is first inserted into place in the socket and the shank then rotated in a clockwise direction (as shown) into jamming contact with the bit to train the latter in place.

In the style shown in FIG. 3, bit 13' is provided with a transverse slot 23 near the lower portion of its forward edge and the rearward portion of shank 14' is provided with a cooperating pawl or key 24. In this instance the bit 13' and shank 14' are assembled first and then installed in assembly into the socket in a counterclockwise direction as indicated by the dash lines in FIG. 3.

The shanks of the present invention such as shown in FIGS. 1-4A hereof are adaptable for use with various existing or preferred styles of bits, by fashioning the bit-engaging portions conformantly to the given bit style. Characteristics of the shanks include the following:

(1) Uniform thickness throughout, in contrast with lateral shouldering as at a swage area in the gullet;

(2) That the outer convex edge of the shank which contacts the sawplate socket is circular and likewise the gullet-forming inner edge of the shank has a major concave circular portion with substantially the same center;

(3) That the radius of said inner concave circular edge portion of the shank is between 45 and 60 and preferably about 50 to 54 percent of the outer shank radius;

(4) That at the bit-receiving end of the shank the concave inner gullet-forming edge merges reversely into a convexity or arcuate segment of a circle, the locus of the center of which and the length of radius are selected so that the full circle of which the segment is a part may be described within the initial overall circumference of the saw plate; within the invention as thus defined such center locus and the segment radius may be varied, according to the desired chip dispersing action, from the point C within the shank body and a radius of about 50 percent of the difference between the inner and outer radii of the shank, as in FIGS. 1, 2 and FIGS. 3, 4, to a point CA rearwardly and inwardly from the end of the shank body, and a correspondingly increased radius but still describing a circle within the confine of the saw plate circumference, as in FIG. 2A and FIG. 4A;

(5) The outer edge of the leading or forward end of the shank, when in position in the saw, extends beyond the intersection of the shank and a line normal to a radius of the saw at the center of the socket.

Preferably the bit abuts the shank in such manner that relatively no more than a quadrant of chip dispersing segment 140, 140A, 140' or 140'A is presented within the gullet region.

The leading end of the shank between the inner and outer edges is shaped to conform generally with and to serve as an extension of the contour of the outer edge of the saw between sockets. The bit engaging portion of the shank, since it has a substantial thickness, may be shaped appropriately to the particular bit with which it is intended to be used; thus the critical configuration of the shank of the present invention is with respect to the gullet-forming portion.

We have found that the convexity or reverse arcuate segment at the rear of the gullet-forming portion as described establishes a chip pattern that may be characterized as a dispersal pattern. This is in contrast to the normal swirl or rotary pattern which results when the chips are routed through a given track. The chips as they leave the cutting edge (at substantially zero velocity at least until the chip is completely severed from the timber) come against the surface of the chip dispersal segment, as at 140, 140A and at 140', 140'A, at different portions thereof and then when they are accelerated to substantially the saw velocity are propelled relative to the gullet along different paths. This prevents jamming of the chips in any single area. Since only the outer quadrant of the chip dispersal segment is exposed, all of the chips are propelled outwardly into the gullet and there is minimal possibility of their collecting at the vicinity of the junction P of the bit and shank and being dragged through the cut.

As earlier pointed out, chips from normally dry timber tend to swirl around in the gullet more freely than those from wet and especially frozen timber where the tendency is to jam together and build up into compacted masses. Accordingly for a major portion of summer sawing there is less need for maximum chip dispersal provision such as obtained with the shank form of FIGS. 1 and 2 having the dispersal segment or gullet-facing convexity 140 of reltaviely short radius and consequent maximum rounding.

Figures 1A, 2:
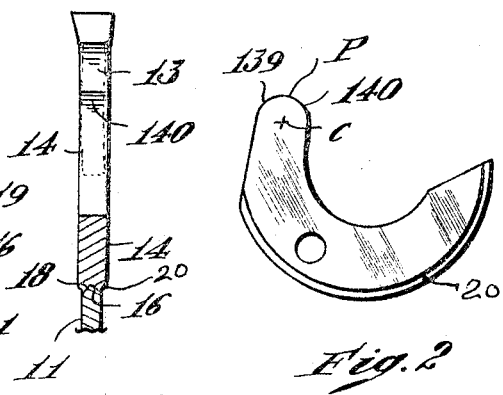
FIG. 1A is a cross-sectional view as on the line 1A—1A of FIG. 1.
FIG. 2 is a side elevation of the bit-holding shank of FIG. 1.

In FIG. 2A the shank 14 of the type of FIGS. 1 and 2 is shown as that having dispersing capacity adequate for timber sawing conditions generally characteristic of summer operations, as upon non-frozen and relatively dry logs. Similarly in FIG. 4A the shank 14' of FIGS. 3 and 4 is shown with correspondingly reduced dispersal capacity.

Thus in what will herein be termed the "summer-type" shank of FIG. 2A the radius of curvature for approximately the gullet-entering front half of the shank rear end is materially increased. Hence the gullet-facing segmental convexity 140A presents a flatter arc for contact by the chips. Such relatively less rounded but still convex segment propels the chips in paths more nearly parallel to each other and so with decreased dispersal, as contrasted with the action of the shorter radius and more rounded arc of the full-dispersal segment of FIGS. 1 and 2.

Such flattening variation of the segmental convexity 140A, FIG. 2A, for the gullet-facing portion of the shank rear end may be defined as the effect of shifting the locus of the center of curvature for said segment portion rearwardly and sufficiently inwardly upon the saw plate 11 so that a full circle described about the shifted center locus, with a radius equal to the distance from the new center locus to the juncture point P of the gullet-facing margin of the shank and the bit will remain within the confine of the saw plate. Examples of approximate radius lengths for regulating the convex gullet-entering arcs of the shanks to afford the selected dispersing capacity in accordance with the invention, for inserted tooth circular saws of average size and using shanks of say 7, 8 and 9 gauge, are from $5/32$ in. minimum radius for the segments 140, 140' of the maximal dispersing shanks as in FIGS. 1 and 2 and in FIGS. 3 and 4 up to a maximum radius of $15/16$ in. for the flattened reduced dispersion segments of 140A, FIG. 2A (and 140'A of FIG. 4A similarly corresponding to FIGS. 3 and 4). Thus the minimal and maximal radius values for the gullet-facing segments controlling the dispersing action under the invention are in the ratio of one to six in the illustrated examples, wherein the inserted parts are shown substantially full scale for the average run of inserted-tooth circular saws for customary timber sawing operations.

With further regard to the above-described provision of the dispersal action by varied radius of the shank segment 140 which extends convexly forwardly into the gullet, it is to be noted that in the illustrated examples the approximate quadrant portion 139 of the shank behind the juncture point P retains the same relatively smaller radius and center locus at C, as appropriate for seating engagement with the bit. But for approximately the front half 140 of this trailing end of the shank the dispersion-decreasing variation is defined as the lengthened segment radius and attendantly flattened the curvature of this gullet-facing part, which may be considered as shifting the center locus therefor rearwardly and inwardly as to points CA of FIGS. 2A and 4A. Thus for maximum chip dispersing effect as for hard, frozen or wet timber both the fore and the after quadrants 140 and 139 of the shank rear end may have a common center C and hence together present substantially a semi-circular shank terminal formation; and for the reduced dispersal action as for summer work the rounding of the fore quadrant or gullet-entering convexity 140A and 140'A of the FIGS. 2A and 4A examples is decreased relative to that of the associated after quadrants, by shift of the center of origin for said gullet-entering convexities to a locus such as at the point CA or elsewhere along a path of center loci represented by the dash-lines through the different center points C and CA of FIGS. 2A and 4A. The extent of varying the center point along such path and attendant increase of the segmental radius and flattening of the dispersion segment is governed by the factors mentioned and may have the dimensional limits for typical examples as elsewhere referred to herein.

As mentioned earlier, the shanks of the invention as herein shown and described are uniform in thickness, save for a shallow edge bevel 20 or 20' at the convex margins. Thus under our invention there is no step between the shank body and the customary thicker portion or swage of the shank.

Ordinarily in prior practice the shank body is as thick as the plate of the saw, while said usual shank swage is as thick as the associated bit body at the gullet-facing front part of the latter, below and exclusive of the cutting edge portion thereof. Said conventional bits, which are useable with the improved shanks herein disclosed, generally decrease in thickness rearwardly toward that of the saw plate adjacent to them, as indicated by the dotted parallel vertical lines on the bit at the upper portion of FIG. 1A. And in corresponding prior shanks having a body of given thickness and a thicker swage area, said difference in thickness as between the shank body and the shank swage has been on the average approximately 0.020 in. on each side of the shank.

In the shank of the present invention, we eliminate the step above referred to and preferably make the thickness of the whole flat body of the shank intermediate to, for instance about half-way between, the thickness of the saw plate and that of prior shank swage portions. This uniform thickness throughout the entire shank body hence preferably is made of a value between the front face and the back face widths of the bit bodies, again excepting the bit cutting edge. Where, as in the normal case, the difference on each side is 0.020 in., the shank is formed to extend on each side 0.010 in. plus or minus 0.005 in. laterally beyond the saw body or plate. Thus except for the mentioned bevel the shank in the entirety is formed 0.020 in ±0.010 in. thicker than the saw body. In a typical instance where the saw body is 0.165 in. thick and the body of the bit at the front face is 0.203 in. wide, the shank is made 0.183 in. wide, which latter value is equivalent to that of the bit body about midway between the front and rear faces thereof, as FIG. 1A intends to exemplify but not to scale.

It is our experience that if these tolerances are exceeded, the shank if above the upper limit rubs in the kerf, heats at the rim and in general performs poorly; and if below the lower limit the clearances between the shank and kerf are such that chip wedging and spilling become a problem. A cross-sectional view on FIG. 3 corresponding to that on line 1a—1a of FIG. 1 would be similar as in FIG. 1A, in the respects here concerned.

We have also found that by elimination of the protruding corner of the swage where the swage meets the gullet-forming portion of the shank near the bottom of the gullet, as in the shank type of FIGS. 3, 4 and 4A we eliminate any torque which tends to push the teeth and the shank out of the socket wherever the shank makes contact with the log for any reason. Where there is a swage, there is a definite step of small frontal area which can dig into the side of the cut. In contrast to this, the flat sides of the shanks hereof present a broad area of contact further away from the side of the cut and without any protrusion to catch onto anything.

Our new design also minimizes dust spillage since there are no large spaces (larger than about 0.015 in. per side) into which chips can jam or wedge and cause the saw to vibrate, heat or run out, or create a torque on the shank in such a direction as to loosen it, this advantage being particularly evident when aperturing of the shank ends is wholly avoided as in the illustrated examples.

The configuration of the profile of the shank, since it is basically a circle within a circle, creates a more symmetrical shank which in conjunction with the increased minimum cross sections, functions as a stronger and more reliable spring which has a greater capability for holding the teeth in place, particularly in view of the fact that some of the reverse torque has been eliminated.

In summary, a major attribute of this new style shank is that it does not creep in use. This prevents damage to both the saw and to the timber being sawed. More particularly:

(1) The rounded chips dispersing convexity or chordal segment:
   (a) disperses the chip, preventing jamming, and may be varied as to the extent of dispersion caused, as appropriate to seasonal or other different operating conditions;
   (b) creates torque in a holding direction against creep;
   (c) does not break up the chips so that small particles can wedge between the shank and the kerf walls;
   (d) increases the mass of material available for wear;
   (e) augments the useful life of the shank;
(2) The increased minimum cross-section of the shank:
   (a) makes a stronger spring;
   (b) makes heat treatment easier;
   (c) makes a more reliable spring;
   (d) allows less room for dust spillage;
   (e) creates more friction torque for holding against creep; and
(3) The elimination of the swage of the shank:
   (a) reduces sawdust spillage by eliminating the pockets to which it can enter;
   (b) reduces the torque in a creeping direction by eliminating dragging corners;
   (c) reduces torque in a creeping direction by eliminating chip wedging at former swage points of the shanks.

Our invention is not limited to the particular embodiments shown and described herein, its scope being pointed out in our following claim.

We claim:

An inserted tooth saw comprising a circular saw body, sockets formed about the periphery of said body, inserted tooth cutter bits for the saw, and shanks replaceably holding said bits in said peripheral sockets, each of said shanks comprising a flat metal body of a general C-shape including rear and forward ends and an intermediate portion, said body formed with flat swageless parallel sides affording it uniform thicknes throughout, said thickness being 0.020 inch plus or minus 0.010 inch thicker than the saw body, whereby it extends not more than about 0.015 inch laterally beyond the saw body on each side, the thickness of said shank body further being dimension between the thickness of the saw body and the width of the body of said bits at the front face thereof, the inner and outer margins of said shank body along the major intermediate portion thereof being formed as corresponding arcs respectively of an inner and relatively smaller circle and of an outer relatively larger and substantially concentric circuit, the radius of said inner margin being 45% to 60% of the outer margin radius, the smaller arc defining the gullet space in the installed position of the shank in the saw socket, the trailing end of the shank body having a bit-engaging rear part and a gullet-entering front part, the marginal edges of said parts joining at the outermost contact point of the shank and the bit when assembled, said rear part comprising approximately a quadrant of a circle centered within the shank body and having a radius equal to about half the difference in length of the radii of the shank outer and inner margins, said front part of said trailing end of the shank body projecting convexly into the gullet space from said shank and bit contact point and merging reversely into the concave margin of said space as an arcuate segment of a circle, the locus of the center of which and the length of radius of which being correlatively such that the full circle of which the segment is a part is defined within the initial overall circumference of the saw plate, said center locus further defined as ranging from a point within the shank body to a point rearwardly and inwardly from the end of the shank body and said segment radius further defined as ranging from about 50% of the difference between the inner and outer radii of the shank to a radius increased correspondingly with the rearward inward positioning of the locus but still describing a cricle within the confine of the saw plate circumference, said rear and front part of said shank trailing end defining a chip dispersal shoulder adapted to propel chips impinging thereupon from the cutting edge of the bit in different paths relative to and outwardly into the gullet space with avoidance by said shank thickness of jamming and compacted collection thereof in the region of the bit and shank junction and with consequent prevention of friction and rotative pressure on the bit and shank by such chip collection, the forward end of said shank extending in the installed positon thereof substantially to the front end of the corresponding saw plate socket and being shaped to conform generally with and to serve as a rearward extension of the adjacent outer edge of the saw plate portion immediately forward of the particular socket wherein the shank is installed, and said shank having only a single transverse through aperture, in the intermediate portion of the shank body, for engagement by and coaction with an installing and removing tool.

References Cited by the Examiner

UNITED STATES PATENTS

| | | | |
|---|---|---|---|
| 326,685 | 9/1885 | Simonds | 143—151 |
| 1,240,331 | 9/1917 | Free | 143—151 |
| 2,122,196 | 6/1938 | Miner et al. | 154—151 |
| 2,934,105 | 4/1960 | Ferguson | 143—151 |
| 3,088,502 | 5/1963 | Kolesh et al. | 143—151 |

DONALD R. SCHRAN, *Primary Examiner.*